Patented May 14, 1940

2,200,705

UNITED STATES PATENT OFFICE 2,200,705

INTERPOLYMERIZATION PRODUCTS OF BUTADIENE AND A VINYL ETHINYL CARBINOL

Wilhelm Sandhaas, Mannheim, Walter Daniel, Ludwigshafen-on-the-Rhine, and Kornelius Mühlhausen, Leverkusen, Germany, assignors to I. G. Farbenindustrie Aktiengesellschaft, Frankfort-on-the-Main, Germany No Drawing. Application January 3, 1938, Serial No. 183,120. In Germany January 5, 1937

4 Claims. (Cl. 260—86)

The present invention relates to rubber-like interpolymerization products and a process of producing same.

It is already known that vinyl ethinyl carbinols can be polymerized and thereby first yield soft substances capable of extension somewhat like rubber, which are converted into hard, brittle products when heated. The latter, contrasted with the rubber-like polymerization products first obtained, are insoluble in organic solvents, such as for example benzine and benzene.

We have now found that rubber-like, stable polymerization products which are also insoluble in organic solvents are obtained by polymerizing in emulsion mixtures of butadiene and vinyl ethinyl carbinols. The vinyl ethinyl carbinols may be obtained in known manner by the action of vinyl acetylene on aldehydes or ketones according to the following reaction:—

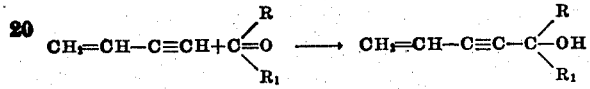

R being hydrogen or an aliphatic, cycloaliphatic, aliphatic-aromatic, aromatic or heterocyclic radicle and R₁ being an aliphatic, cycloaliphatic, aliphatic-aromatic, aromatic or heterocyclic radicle. For example vinyl ethinyl dimethyl carbinol is obtained from vinyl acetylene and acetone and 1-vinyl-ethinyl-cyclohexane-1-ol from vinyl acetylene and cyclohexanone.

The polymerization may be carried out in known manner, as for example by heating the mixture of the monomers in the presence of peroxides in aqueous emulsion.

The polymerization products obtained have good mechanical properties and are practically insoluble in organic solvents, in particular benzine, benzene and lubricating oils. In addition to the purposes for which natural rubber is suitable, they may also be used for purposes where resistance to organic solvents, in particular to motor fuels and lubricating oils, is required. The interpolymerization products may be mixed with fillers and dyestuffs in the manner usual in the rubber industry and may be vulcanized, after the addition of vulcanizing agents, vulcanization accelerators and if desired agents protecting against ageing, to form articles similar to soft or hard rubber.

The following example will further illustrate how this invention may be carried out in practice but the invention is not restricted to this example. The parts are by weight.

Example 75 parts of butadiene and 25 parts of vinyl ethinyl dimethyl carbinol are emulsified with 150 parts of a 10 per cent aqueous solution of oleic acid sodium salt and after the addition of 0.35 part of ammonium persulphate the whole is kept at 30° C. for 115 hours. After adding a small amount of phenyl beta-naphthyl amine dissolved in benzene or dispersed in water the interpolymerization product formed may be coagulated from the aqueous dispersion by an addition of sodium chloride and acetic acid, an elastic plastic mass being obtained. It yields when vulcanized rubber-like masses having excellent mechanical properties and being insoluble in gasoline, benzene and lubricating oils.

What we claim is:

1. The process of producing rubber-like interpolymerization products which comprises polymerizing a mixture of about three parts of butadiene and one part of vinyl ethinyl dimethyl carbinol in aqueous emulsion.

2. Rubber-like interpolymerization products of butadiene and vinyl ethinyl dimethyl carbinol, substantially identical with the products obtained by the process defined in claim 1.

3. A process of producing rubber-like interpolymerization products which comprises polymerizing a mixture of about three parts of butadiene and one part of a vinyl ethinyl carbinol in aqueous emulsion.

4. Rubber-like interpolymerization products of butadiene and a vinyl ethinyl carbinol, substantially identical with the products obtained by the process defined in claim 3.

WILHELM SANDHAAS.
WALTER DANIEL.
KORNELIUS MÜHLHAUSEN.